United States Patent
Jan et al.

(12)

(10) Patent No.: US 10,844,765 B2
(45) Date of Patent: Nov. 24, 2020

(54) AERODYNAMIC CATALYTIC CONVERTER

(71) Applicants: Jonathan Jan, Culver City, CA (US); Alvin A. Snaper, Las Vegas, NV (US)

(72) Inventors: Jonathan Jan, Culver City, CA (US); Alvin A. Snaper, Las Vegas, NV (US)

(*) Notice: Subject to any disclaimer, the term of this patent is extended or adjusted under 35 U.S.C. 154(b) by 0 days.

(21) Appl. No.: 16/450,349

(22) Filed: Jun. 24, 2019

(65) Prior Publication Data
US 2020/0003100 A1 Jan. 2, 2020

Related U.S. Application Data

(60) Provisional application No. 62/690,394, filed on Jun. 27, 2018.

(51) Int. Cl.
| | |
|---|---|
| *F01N 3/28* | (2006.01) |
| *B01D 53/94* | (2006.01) |
| *F01N 3/34* | (2006.01) |
| *F01N 3/08* | (2006.01) |
| *F01N 3/10* | (2006.01) |

(52) U.S. Cl.
CPC ....... *F01N 3/2892* (2013.01); *B01D 53/9454* (2013.01); *F01N 3/0892* (2013.01); *F01N 3/2825* (2013.01); *F01N 3/2882* (2013.01); *F01N 3/34* (2013.01); *F01N 2330/06* (2013.01); *F01N 2370/02* (2013.01); *F01N 2510/06* (2013.01)

(58) Field of Classification Search
None
See application file for complete search history.

(56) References Cited

U.S. PATENT DOCUMENTS

| | | |
|---|---|---|
| 2,013,956 A | 9/1935 | Heath |
| 3,662,541 A | 5/1972 | Sawada et al. |
| 7,051,524 B1 | 5/2006 | Kraft |
| 2001/0043890 A1 | 11/2001 | Son |

(Continued)

FOREIGN PATENT DOCUMENTS

| | | | |
|---|---|---|---|
| WO | 2016/141106 A1 | 9/2016 | |
| WO | WO-2016141106 A1 * | 9/2016 | ............ F16L 55/052 |

OTHER PUBLICATIONS

International Search Report in the parent PCT application No. PCT/US2019/038768, dated Aug. 27, 2019.

(Continued)

*Primary Examiner* — Jelitza M Perez
(74) *Attorney, Agent, or Firm* — Chen Yoshimura LLP

(57) ABSTRACT

An improved catalytic converter includes a Coanda chamber assembly connected upstream of a catalytic reaction chamber, where the exhaust pipe is to be connected to the Coanda chamber assembly. The Coanda chamber assembly forms a Coanda chamber that has at least one narrower section and at least one wider section immediately downstream of the narrower section, with openings formed at the narrowest point of a narrower section. In operation, when engine exhaust gas is fed into the Coanda chamber, the gas pressure increases at the narrower section, and drops when the gas enters the wider section. As a result, air is sucked into the Coanda chamber via the openings and mixes with the exhaust gas. This lowers the exhaust temperature and enhances the efficiency of the catalytic reactions in the catalytic reaction chamber.

20 Claims, 4 Drawing Sheets

(56) References Cited

U.S. PATENT DOCUMENTS

| | | |
|---|---|---|
| 2005/0112043 A1 | 5/2005 | Sparling et al. |
| 2008/0053748 A1 | 3/2008 | Emler |
| 2009/0057056 A1* | 3/2009 | Baumgartner ............ F01N 1/04 |
| | | 181/256 |
| 2017/0316133 A1 | 11/2017 | Abramov |

OTHER PUBLICATIONS

Written Opinion in the parent PCT application No. PCT/US2019/038768, dated Aug. 27, 2019.
Rani et al., "Experimental Analysis on Emissions & Back Pressure of a Diesel Engine Using Catalytic Converter With Air-Box", International Research Journal of Engineering and Technology (IRJET), vol. 03, Issue 07, Jul. 2016, pp. 1200-1203.
Karuppusamy et al., "Design, Analysis of Flowcharacteristics of Catalytic Converter and Effects of Backpressure on Engine Performance", IJREAT International Journal of Research in Engineering & Advanced Technology, vol. 1, Issue 1, Mar. 2013, pp. 1-6.
Jääskeläinen, "Engine Exhaust Back Pressure", DieselNet.com, Ecopoint Inc., Revision 2007.03a.
Gonzales, "Diesel Exhaust Emission System Temperature Test", Forest Service, National Technology & Development Program, U.S. Department of Agriculture, Dec. 2008, https://www.fs.fed.us/eng/pubs/pdf/08511816.pdf.
DieselNet.com, "Diesel Exhaust Particle Size", Ecopoint Inc., Revision 2002.11c.
Castillo et al., "Exhaust Manifold Pressure Estimation Diesel Equipped with a VGT Turbocharger", SAE World Congress 2013, conference paper 2013-01-1752, 2013.

\* cited by examiner

AERODYNAMIC CATALYTIC CONVERTER

BACKGROUND OF THE INVENTION

Field of the Invention

This invention relates to a catalytic converter.

Description of Related Art

Catalytic converters have been widely used in the past 40 years as a means to minimize exhaust gas pollutants for internal combustion engines.

First generation catalytic converters are made up of ceramic beads coated with noble metal oxide catalysts that are packed inside a steel tube that is attached to the engine exhaust pipe. Ceramic is a refractory material that accumulates heat. The un-burnt hydrocarbon in the exhaust gas is oxidized by the catalysts in the chamber. Due to the restriction of gas flow through the catalytic converter, excessive backpressure compromises the engine's efficiency. The loosely packed ceramic beads also accumulate heat as well as solid particulate deposit. Fire hazards and clogged catalytic converters are common.

Second generation catalytic converters use honeycomb ceramic structure which is coated with catalysts. Gas flow is more efficient through the honeycomb, but overheating and clogging are still inevitable issues.

Third generation diesel emission control systems installs a Diesel Particulate Filter (DPF) to capture the soot (un-burnt particulates). DPF is placed right after the exhaust manifold. It is a canister of honeycomb structure that captures the particulates. An internal electric circuit that burns off the accumulated soot is controlled by the engine management system when the DPF is clogged up causing high backpressure. The inorganic matters, minerals from the soot become ash and stays inside the DPF. Eventually the DPF is clogged and requires replacement. Damages to the engine is also inevitable Fleet operators have experienced substantial downtime and increased maintenance costs.

Beginning in 2009, the industry adopted "BlueTec" developed by Mercedes Benz®. BlueTec has a separate UREA tank that injects urea into the exhaust manifold/DPF. The purpose is to burn off everything in the exhaust gas. Urea is a volatile explosive. It can detonate under certain conditions. There have been numerous incidents that diesel cars flaring up in parking structures. When urea leaks into the exhaust system, it blows up upon encountering hot catalytic converter elements.

In their 2016 experiment report (EXPERIMENTAL ANALYSIS ON EMISSIONS & BACK PRESSURE OF A DIESEL ENGINE USING CATALYTIC CONVERTER WITH AIR-BOX Jamuna Rani. G, Dr. Y. V. Hanumantha Rao, Dr. B. Balakrishna. International Research Journal of Engineering and Technology (IRJET), Volume: 03 Issue: 7, Jul. 2016), Rani et al rigged an air-box to the diesel exhaust manifold. The objective was to reduce engine backpressure. Meanwhile, the fresh air mixed into the exhaust gas promoted secondary oxidation of the soot. Active air-injection into the exhaust manifold was common in automotive smog devices in the 1970's. Against engineering common sense, the injected air causes high backpressure, choking the engine. And pump failure is inevitable.

SUMMARY

Embodiments of the present invention provide an improved catalytic converter. The improved catalytic converter has the following advantages over the conventional art:

Firstly, the core of the improved catalytic converter is made of a three-dimensional reticulated ceramic structure. For the same volume of the core, reticulated ceramic has approximately four times the surface area of honeycomb ceramics. And there is less friction of gas flow. This is commonly referred to as laminar flow, meaning that gas flows along the surface of the ceramic. Less back-pressure improves the engine efficiency. The ceramic is made from a clay formula where ceramic bubbles are incorporated not only to reduce the weight, but also to improve the structural strength. Less heat is accumulated in the lightweight ceramic thereby minimizing overheating and fire hazard. Mica flakes may also be included in the clay. This can increase the refractive index, thus more heat can be irradiated away from the ceramic material. Catalytic reduction process is more efficient at lower temperature.

Secondly, a Coanda effect chamber is installed between the exhaust pipe and the inlet of the catalytic converter. Fresh air is introduced into the Coanda chamber via aspiration. Fresh air is decelerated then accelerated when mixed with exhaust gas in the Coanda chamber. This lower-temperature higher-volume gas has more oxygen supply that enhances the oxidation process by the catalysts. It also reduces NOx, a volatile product from high operating temperature in the combustion chamber, back into stable state of nitrogen molecules.

Additionally, for marine diesels running on dirty fuel, and maritime vessels powered with 2-stoke bunker oil engines, a pair of high-voltage electrostatic grid is incorporated at the secondary compression stage whereby the soot is disintegrated and oxidized before entering the catalytic converter. This corona discharge reactor is installed at the neck of the second compression zone of the Coanda chamber.

Even though embodiments of the present invention describe treating exhaust gas from internal combustion engines, the invention is not limited to automotive and/or utility equipment. The method and device can also be adapted to other industrial processes such as petrochemical refining, as well as solid-state fuel cells.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve the above objects, the present invention provides a catalytic converter, which includes: a catalytic reaction chamber, which includes a catalytic reactor housing and a catalytic reactor core disposed inside the catalytic reactor housing; and a Coanda chamber assembly, having a downstream end connected to the catalytic reaction chamber and an upstream end adapted to be connected to an exhaust pipe, the Coanda chamber assembly including an interior housing which defines an interior space, wherein the interior space extends in a longitudinal direction and has varying diameters along the longitudinal direction defining a plurality of sections, including at least a first narrower section and a first wider section immediately downstream of the first narrow section, wherein a lateral dimension of a widest point of the first wider section is 2 to 3 times a lateral dimension of a narrowest point of the first narrower section, the interior housing further including one or more openings located at the narrowest point of the first narrower section or between the narrowest point of the first narrower section and the widest point of the first wider section.

In some embodiments, the interior space further includes an upstream wider section located upstream of the first narrower section, a second narrower section located downstream of the first wider section, and a downstream wider section located downstream of the second narrower section, and a corona discharge reactor is disposed inside the interior space of the interior housing at the second narrower section, the corona discharge reactor including a housing formed of a high temperature ceramic material and two metallic wire mesh electrodes mounted inside the housing, the tow electrodes being parallel to and spaced apart from each other and adapted to be applied a high voltage between them.

In some embodiments, the Coanda chamber assembly further includes an exterior housing disposed outside the interior housing, the exterior housing including an air inlet located at a longitudinal location corresponding to the first narrower section, wherein the exterior housing and the interior housing define an air space between them, and wherein the one or more openings are in fluid communication with the air inlet via the air space.

In another aspect, the present invention provides a Coanda chamber assembly adapted to be used with a catalytic reaction chamber, the Coanda chamber including: an interior housing which defines an interior space, wherein the interior space extends in a longitudinal direction and has varying diameters along the longitudinal direction defining a plurality of sections, including at least a first narrower section and a first wider section immediately downstream of the first narrow section, wherein a lateral dimension of a widest point of the first wider section is 2 to 3 times a lateral dimension of a narrowest point of the first narrower section, the interior housing further including one or more openings located at the narrowest point of the first narrower section or between the narrowest point of the first narrower section and the widest point of the first wider section; and an exterior housing disposed outside the interior housing, the exterior housing including an air inlet, wherein the exterior housing and the interior housing define an air space between them, and wherein the one or more openings are in fluid communication with the air inlet via the air space.

In another aspect, the present invention provides a catalytic converter, which includes: a housing; and a catalytic reactor core disposed inside the catalytic reactor housing, the catalytic reactor core being formed of a reticulated ceramic coated with a catalyst.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
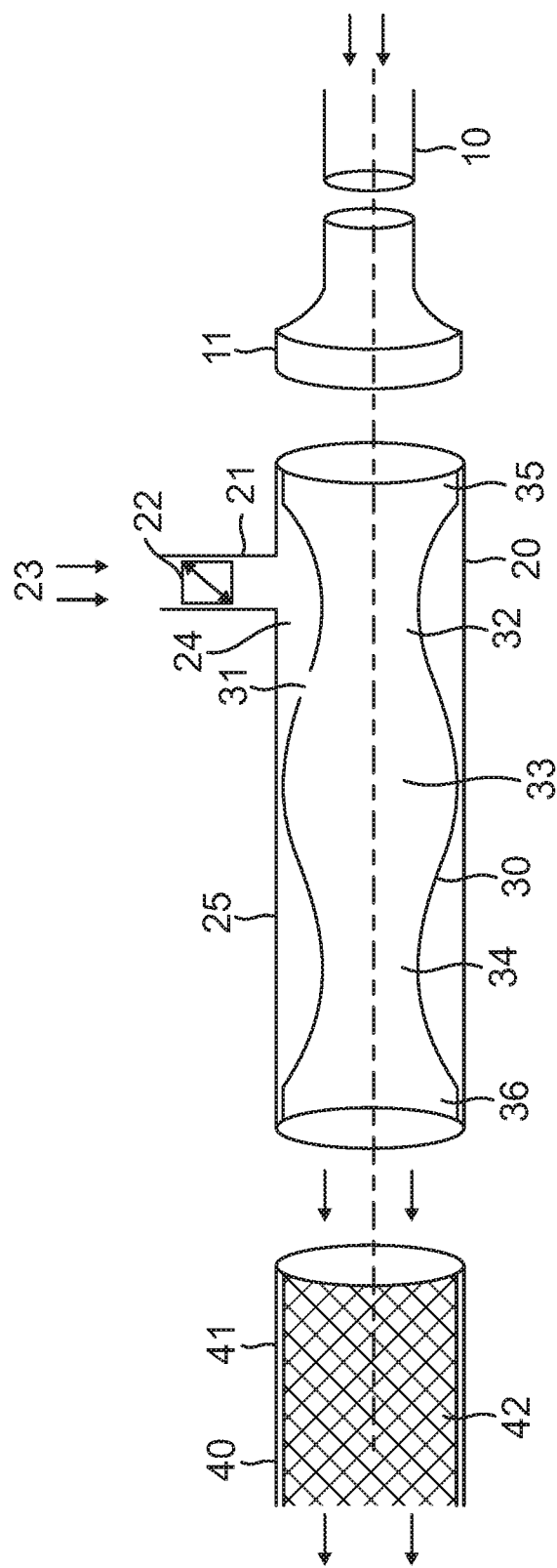
FIG. 1 is a schematic side cross-sectional view of a catalytic converter according to an embodiment of the present invention.

FIG. 1 is a cross-sectional view of the catalytic converter according to an embodiment of the present invention, in a plane passing through its longitudinal axis of the catalytic converter. The catalytic converter includes a Coanda chamber assembly 25 and a catalytic reaction chamber 40. The Coanda chamber assembly 25 is coupled at its distal (downstream) end to the catalytic reaction chamber 40 and at its proximate (upstream) end to an exhaust pipe 10. The interior space (the Coanda chamber), as defined by an interior housing 30, is rotationally symmetrical around the longitudinal axis and has varying diameters, including at least a first narrower section 32 (the most upstream narrower section) and a first wider section 33 immediately downstream of the first narrow section. Preferably, the diameter at the widest point of the first wider section 33 is 2 to 3 times the diameter at the narrowest point of the first narrower section 32. In the illustrated embodiment, the interior space defined by the interior housing 30 additionally has wider sections 35, 36 at the proximate and distal ends, respectively, and a second narrower section 34 immediately downstream of the first wider section 33, such that the first wider section 33 is located between the first and second narrower sections 32 and 34. The cross-sectional shape of the interior housing 30 is preferably a smooth curve.

The exterior housing 20 of the Coanda chamber assembly 25 may have a cylindrical shape with a uniform outer diameter for convenience, but other shapes may also be used, so long as it can properly accommodate the interior housing 30 within it and leaves an air space between it and the interior housing 30 as described later. Both the interior housing 30 and the exterior housing 20 are preferably made of a metal or ceramic material or a combination thereof.

Figure 2:
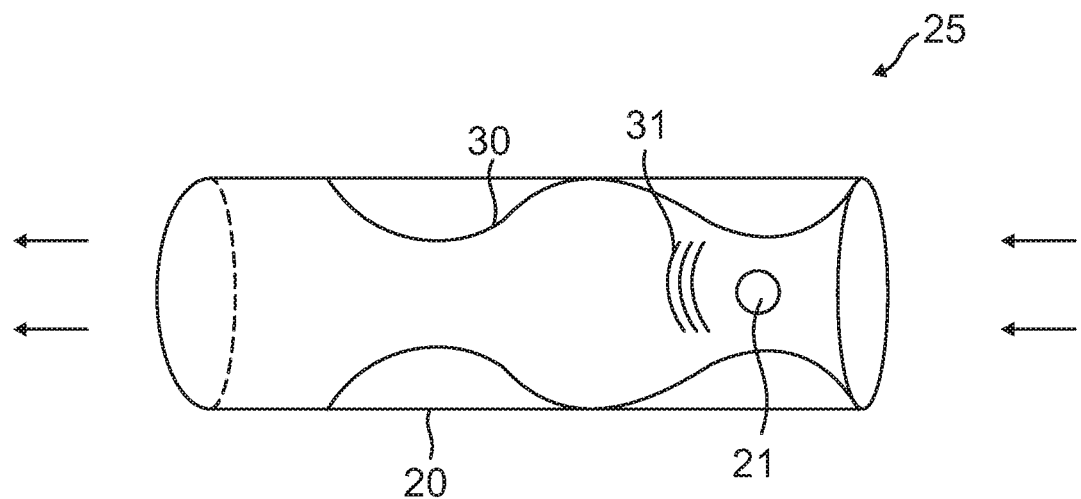
FIG. 2 is a top view of the Coanda chamber assembly of the catalytic converter of FIG. 1.

An air inlet 21 is provided on the exterior housing 20 at a longitudinal location corresponding to the first narrower section 32. One or more openings (cutout slots) 31 are formed on the interior housing 30 at locations at the narrowest point of the first narrower section 32, or between the narrowest point of the first narrower section 32 and the widest point of the first wider section 33. In a preferred embodiment, the openings 31 are located at the narrowest point first narrower section 32. In some embodiments, the openings 31 have elongated shapes parallel to a transverse plane, as shown in FIG. 2. The openings 31 can also be a plurality of holes drilled, for ease of manufacturing. When multiple openings are provided, they may be located at substantially the same angular locations with respect to the longitudinal axis (as shown in FIG. 2) or distributed at different angular locations with respect to the longitudinal axis (not shown). The openings 31 are in fluid communication with the air inlet 21 via an empty air space 24 that exists between the exterior housing 20 and the interior housing 30 around the first narrower section 32. Except for the cutout slots 31 and the two open ends, the Coanda chamber is fully enclosed.

In operation, engine exhaust gas in the exhaust pipe 10 is fed into the interior of the Coanda chamber 30 via a coupling section or union 11. Within the Coanda chamber, according to Coanda's principle of "laminar flow" of fluids, the gas pressure increases at a narrower section of the Coanda chamber such as the first narrower section 32. The pressure drops when the gas enters a subsequent large diameter part of the chamber such as the first wider section 33. Air is sucked into the Coanda chamber 30 via cutout slots 31 where the gas is expanding. Ambient air 23 is in turn sucked into the space 24 between the exterior and interior housings via the fresh air inlet 21. A flow check valve (i.e. one-direction valve) 22 is provided in the inlet 21 to prevent gas from escaping from the Coanda chamber via the inlet during engine starting and deceleration. The exhaust gas mixed with fresh air is then compressed in the second narrower section 34 and expanded again in the wider section 36 downstream of the second narrower section 34 near the distal end.

The advantages of employing the Coanda chamber are: 1. By introducing fresh air, the exhaust temperature is lowered. 2. Fresh air containing oxygen enhances the efficiency of the catalytic reactions in the catalytic reaction chamber.

The catalytic reaction chamber 40 includes a catalytic reactor housing 41 and a catalytic reactor core 42 inside the housing. The catalytic reactor core 42 is made of a reticulated ceramic, preferably a uni-body reticulated ceramic piece, which fits inside the catalytic reactor housing 41. The reticulated ceramic is coated with a catalyst. Any suitable catalysts may be used, such as precious metals and other metals, etc.

FIG. 2 is a schematic top perspective view of the Coanda chamber assembly 25 to illustrate the locations and shape of the cutout slots 31. Note that the cutout slots 31 appear curved in this view because they are intended to be parallel to the transverse plane which is perpendicular to the longitudinal axis. Also note that the cutout slots 31 are located on the interior surface 30 while the inlet 21 is located on the exterior surface 20. As described earlier, the cutout slots 31 facilitate fresh air entering the Coanda chamber 30 during the first expansion cycle. The amount of air drawn into the Coanda chamber 30 is controlled by the number and sizes of the cutout slots 31.

Note that the exterior housing 20 is optional. When the exterior housing 20 is not used, the air inlet 21 with the flow check valve 22 may be affixed to and extend from the interior housing 30 directly.

Figure 3:
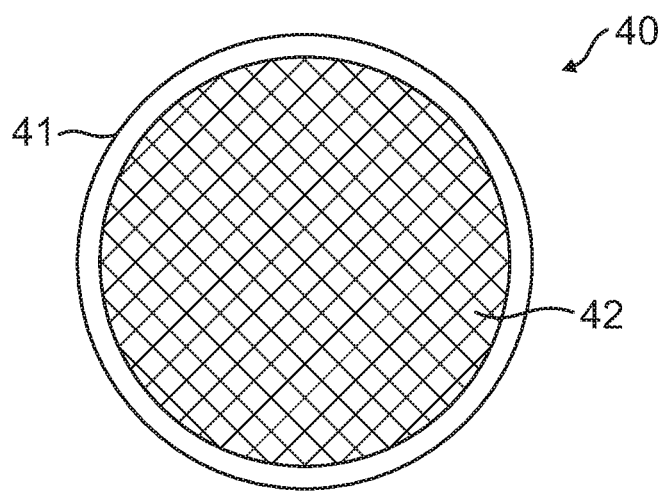
FIG. 3 is cross-sectional view of the catalytic reaction chamber of the catalytic converter of FIG. 1, showing the reticulated ceramic reactor core.

FIG. 3 is cross-sectional view of the catalytic reactor 40 viewed along the longitudinal axis. Gas flows through the ceramic catalytic reactor core 42 where the un-burnt hydrocarbon is oxidized while carbon-monoxide and NOx are neutralized. Sulfur-oxides and phosphate-oxides are also reduced to element state. The reticulated ceramic offers much less airflow resistance than a honeycomb structure and has approximately 4 times more reacting surface area. Furthermore, the microscopic pores of the ceramic surface serve as molecular sieves that capture the particulates in the exhaust gas for catalytic reactions.

Figure 4:
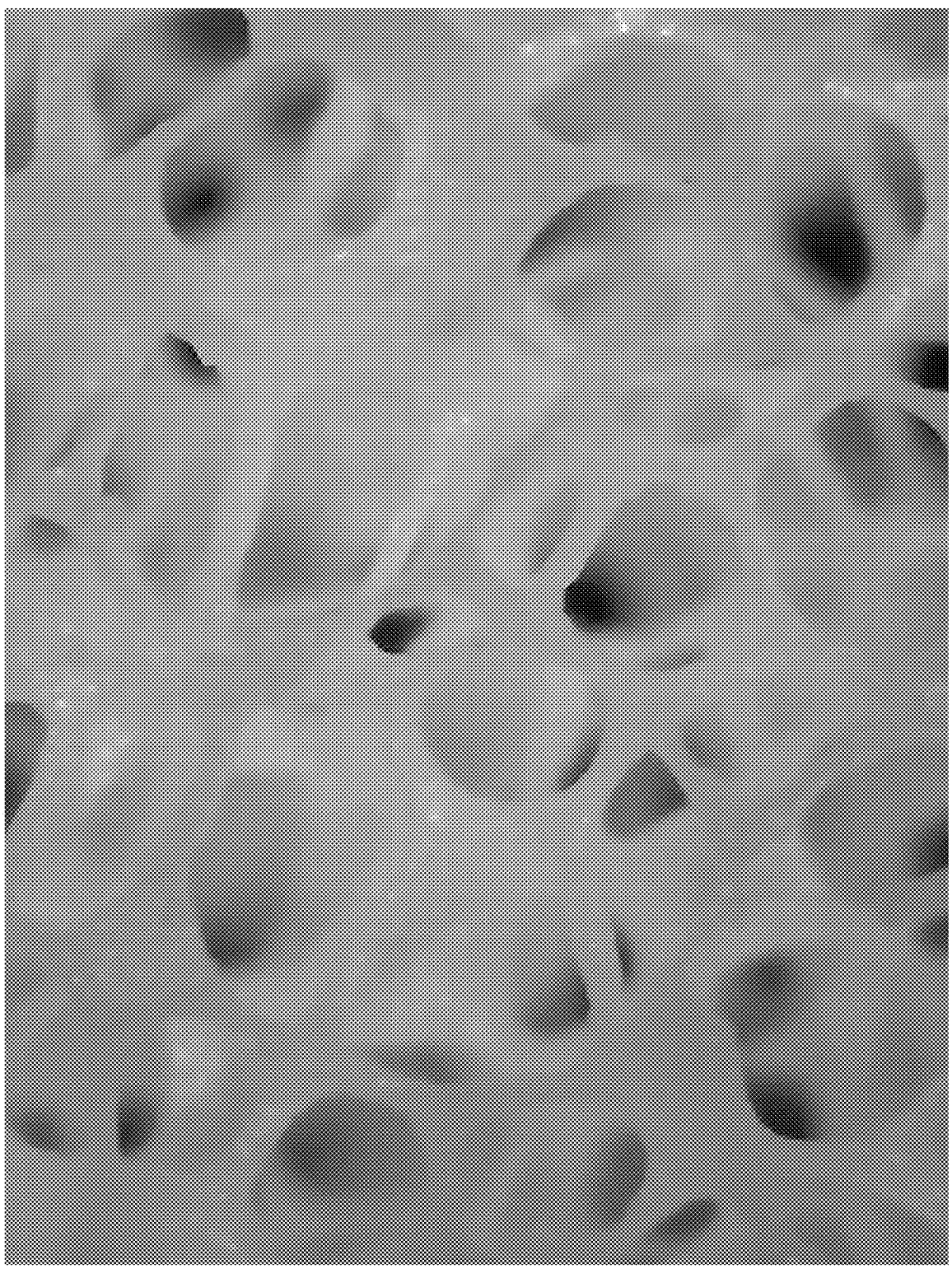
FIG. 4 is a photo showing the structure of a reticulated ceramic material that may be used in the catalytic converter according to embodiments of the present invention.

FIG. 4 is a photo demonstrating the structure of a reticulated ceramic material that may be used in the catalytic converter according to embodiments of the present invention. A method of making a reticulated ceramic material is described in commonly owned U.S. patent application Ser. No. 15/864,383, filed 8 Jan. 2018, which is incorporated by reference in its entirety. Other suitable methods of making a reticulated ceramic material may also be used. Certain reticulated ceramic materials are commercially available. The reticulated ceramic is coated with a mixture of micron-sized oxidizing and reduction catalysts, which serve as molecular sieves to maximize the catalytic efficiency.

Figure 5:
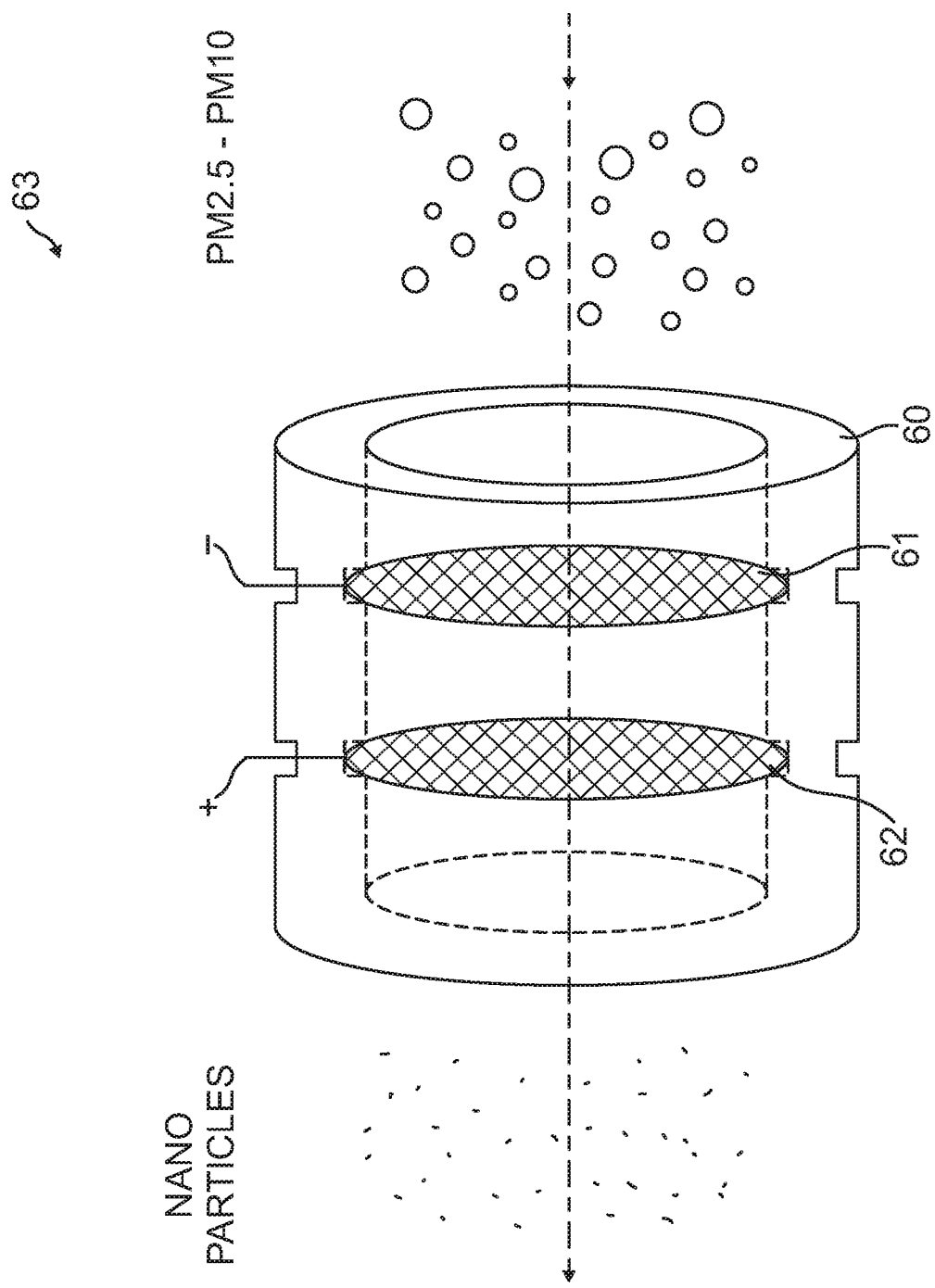
FIG. 5 is a cross-sectional view of a corona discharge reactor of the catalytic converter according to an embodiment of the present invention.

FIG. 5 is the cross-sectional view of a corona discharge reactor 63 that can be installed inside the Coanda chamber 30. A housing 60 of the corona discharge reactor 63, preferably cylindrical shaped, fits inside the second narrower section 32 of the interior housing 30 of the Coanda chamber assembly. Metallic wire mesh electrodes 61 and 62 are mounted inside the housing 60, parallel to and spaced apart from each other, and a high voltage is applied between the electrodes. Preferably, the more upstream electrode 61 is at a lower potential than the more downstream electrode 62. The preferred voltage is 2,000 volts or higher. Soot particulates passing through the electrodes are broken down into nano-particles due to the corona discharge effect. The nano-particles are neutralized when passing through the downstream catalytic reactor 40. The housing 60 is preferably made of a high temperature ceramic material.

Although the above descriptions refer to treating gas, the invention may also be used to tread liquids.

It will be apparent to those skilled in the art that various modification and variations can be made in the improved catalytic converted and related method of the present invention without departing from the spirit or scope of the invention. Thus, it is intended that the present invention cover modifications and variations that come within the scope of the appended claims and their equivalents.

What is claimed is:

1. A catalytic converter comprising:
a catalytic reaction chamber, which includes a catalytic reactor housing and a catalytic reactor core disposed inside the catalytic reactor housing; and
a Coanda chamber assembly, having a downstream end connected to the catalytic reaction chamber and an upstream end adapted to be connected to an exhaust pipe, the Coanda chamber assembly including an interior housing which defines an interior space, wherein the interior space extends in a longitudinal direction and has varying diameters along the longitudinal direction defining a plurality of sections, including at least a first narrower section, a first wider section immediately downstream of the first narrower section, a second narrower section immediately downstream of the first wider section, and a downstream wider section immediately downstream of the second narrower section, wherein a lateral dimension of a widest point of the first wider section is 2 to 3 times a lateral dimension of a narrowest point of the first narrower section, the interior housing further including one or more openings located at the narrowest point of the first narrower section or between the narrowest point of the first narrower section and the widest point of the first wider section, wherein the interior housing is fully enclosed except for the upstream end, the downstream end and the openings, being free of any additional openings between the upstream end and the narrowest point of the first narrower section and between the widest point of the first wider section and the downstream end.

2. The catalytic converter of claim 1, wherein the catalytic reactor core is formed of a reticulated ceramic coated with one or more catalysts.

3. The catalytic converter of claim 1, wherein the interior housing is made of a metal or a ceramic material or a combination of metal and ceramic material.

4. The catalytic converter of claim 1, wherein the openings have elongated shapes perpendicular to the longitudinal direction.

5. The catalytic converter of claim 1, wherein the interior space is rotationally symmetrical around a longitudinal axis.

6. The catalytic converter of claim 1, wherein the interior space includes exactly two narrower sections and exactly three wider sections, including the first narrower section, the second narrower section, the first wider section, the downstream wider section, and an upstream wider section located upstream of the first narrower section.

7. The catalytic converter of claim 1, wherein the Coanda chamber assembly further includes an exterior housing disposed outside the interior housing, the exterior housing including an air inlet located at a longitudinal location corresponding to the first narrower section, wherein the exterior housing and the interior housing define an air space between them, and wherein the one or more openings are in fluid communication with the air inlet via the air space.

8. The catalytic converter of claim 7, wherein the Coanda chamber assembly further includes a flow check valve disposed inside the air inlet and configured to prevent gas flow from the interior space via the air inlet.

9. The catalytic converter of claim 7, wherein the exterior housing is made of a metal or a ceramic material or a combination of metal and ceramic material.

10. A catalytic converter, comprising:
a catalytic reaction chamber, which includes a catalytic reactor housing and a catalytic reactor core disposed inside the catalytic reactor housing; and
a Coanda chamber assembly, having a downstream end connected to the catalytic reaction chamber and an upstream end adapted to be connected to an exhaust pipe, the Coanda chamber assembly including an interior housing which defines an interior space, wherein the interior space extends in a longitudinal direction and has varying diameters along the longitudinal direction defining a plurality of sections, including at least a first narrower section and a first wider section immediately downstream of the first narrower section, wherein a lateral dimension of a widest point of the first wider section is 2 to 3 times a lateral dimension of a narrowest point of the first narrower section, the interior housing further including one or more openings located at the narrowest point of the first narrower section or between the narrowest point of the first narrower section and the widest point of the first wider section,
wherein the Coanda chamber assembly further includes a corona discharge reactor disposed inside the interior space of the interior housing, the corona discharge reactor including a housing formed of a high temperature ceramic material and two metallic wire mesh electrodes mounted inside the housing, the two electrodes being parallel to and spaced apart from each other with empty space in between, and adapted to be applied a high voltage between them.

11. The catalytic converter of claim 10, wherein the interior space further includes an upstream wider section located upstream of the first narrower section, a second narrower section located downstream of the first wider section, and a downstream wider section located downstream of the second narrower section, and wherein the corona discharge reactor is disposed inside the interior space of the interior housing at the second narrower section.

12. A Coanda chamber assembly adapted to be used with a catalytic reaction chamber, comprising:
an interior housing which defines an interior space, wherein the interior space extends in a longitudinal direction and has varying diameters along the longitudinal direction defining a plurality of sections, including at least a first narrower section, a first wider section immediately downstream of the first narrower section, a second narrower section immediately downstream of the first wider section, and a downstream wider section immediately downstream of the second narrower section, wherein a lateral dimension of a widest point of the first wider section is 2 to 3 times a lateral dimension of a narrowest point of the first narrower section, the interior housing further including one or more openings located at the narrowest point of the first narrower section or between the narrowest point of the first narrower section and the widest point of the first wider section, wherein the interior housing is fully enclosed except for the upstream end, the downstream end and the openings, being free of any additional openings between the upstream end and the narrowest point of the first narrower section and between the widest point of the first wider section and the downstream end; and
an exterior housing disposed outside the interior housing, the exterior housing including an air inlet, wherein the exterior housing and the interior housing define an air space between them, and wherein the one or more openings are in fluid communication with the air inlet via the air space.

13. The Coanda chamber assembly of claim 12, wherein both the interior housing and the exterior housing are made of a metal or a ceramic material or a combination of metal and ceramic material.

14. The Coanda chamber assembly of claim 12, wherein the openings have elongated shapes perpendicular to the longitudinal direction.

15. The Coanda chamber assembly of claim 12, wherein the interior space is rotationally symmetrical around a longitudinal axis, and the exterior housing has a cylindrical shape with a uniform outer diameter.

16. The Coanda chamber assembly of claim 12, wherein the air inlet is located at a longitudinal location corresponding to the first narrower section.

17. The Coanda chamber assembly of claim 16, further comprising a flow check valve disposed inside the air inlet and configured to prevent gas flow from the interior space via the air inlet.

18. The Coanda chamber assembly of claim 12, further comprising:
a corona discharge reactor disposed inside the interior space of the interior housing, the corona discharge reactor including a housing and two metallic wire mesh electrodes mounted inside the housing, the two electrodes being parallel to and spaced apart from each other with empty space in between, and adapted to be applied a high voltage between them.

19. The Coanda chamber assembly of claim 18, wherein the housing of the corona discharge reactor is formed of a high temperature ceramic material.

20. The Coanda chamber assembly of claim 18, wherein the interior space further includes an upstream wider section located upstream of the first narrower section, a second narrower section located downstream of the first wider section, and a downstream wider section located downstream of the second narrower section, and wherein the corona discharge reactor is disposed inside the interior space of the interior housing at the second narrower section.

* * * * *